United States Patent [19]

Hattori et al.

[11] 4,181,937
[45] Jan. 1, 1980

[54] DATA PROCESSING SYSTEM HAVING AN INTERMEDIATE BUFFER MEMORY

[75] Inventors: Akira Hattori, Yokohama; Takamitsu Tsuchimoto, Machida, both of Japan

[73] Assignee: Fujitsu Limited, Japan

[21] Appl. No.: 846,427

[22] Filed: Oct. 28, 1977

[51] Int. Cl.² .......................................... G06F 15/16
[52] U.S. Cl. ................................................. 364/200
[58] Field of Search ... 364/200 MS File, 900 MS File

[56] References Cited

U.S. PATENT DOCUMENTS

| | | | |
|---|---|---|---|
| 3,848,234 | 11/1974 | MacDonald | 364/200 |
| 3,886,525 | 5/1975 | Brown et al. | 364/200 |
| 3,938,097 | 2/1976 | Niguette | 364/200 |
| 3,984,818 | 10/1976 | Gnadeberg et al. | 364/200 |
| 4,001,786 | 1/1977 | Boehm | 364/200 |
| 4,050,059 | 9/1977 | Williams et al. | 364/200 |

Primary Examiner—Raulfe B. Zache
Attorney, Agent, or Firm—Staas & Halsey

[57] ABSTRACT

In a data processing system having an intermediate buffer memory provided between a large space main memory and small space, high speed buffer memories of a plurality of processors, a data block of the intermediate buffer memory to be replaced with a data block of the main memory is determined by utilizing LRU (least Recently Used) algorithm as well as copy flags employed in buffer invalidation processing. In the intermediate buffer memory, a data block that the number of its copy flags in the ON state is smaller than any other data blocks, is selected as the data block to be replaced. The fact that the number of copy flags in the ON state implies that the data block is not frequently used by the processors. Replacement of such a data block alleviates the burden of the buffer invalidation processing imposed on the intermediate buffer memory.

5 Claims, 7 Drawing Figures

DATA PROCESSING SYSTEM HAVING AN INTERMEDIATE BUFFER MEMORY

BACKGROUND OF THE INVENTION

1. Field of the Invention

This invention relates to a buffer memory system for a data processing system having an intermediate buffer memory between a main memory and buffer memories of a plurality of processors, and more particularly to a system for replacement of a data block of the intermediate buffer memory with a data block of the main memory.

2. Description of the Prior Art

In a large-sized data processing system requiring a large space, high speed memory, a memory hierarchy control is effected by providing a high speed, small space buffer memory at a stage higher than a large space, relatively low speed main memory.

In such a system, while a certain address is being read out from the main memory into the buffer memory, input data may be written in the same address from an input device in some cases.

Not only in the simultaneous operation of an input-/output channel and a processor itself but also in multi-processing, multi-programming, TSS(Time Sharing System), etc., there occurs timingly and logically simultaneous read and write of the same stored content. Accordingly, it is necessary to design the data processing system to ensure that the same information is shared even in the case of read and write of different memory hierarchies or different areas of a higher memory hierarchy.

When a write has taken place in the higher memory hierarchy such as the buffer memory, a lower memory hierarchy such as the main memory is renewed to reflect the write. In the case of a write in the lower memory hierarchy, information of the higher memory hierarchy is made invalid. Where the lower memory hierarchy is of an address assignment system, renewal of information is usually achieved immediately and locally.

Almost all of recent high-speed and large-sized data processing systems employ buffer memories but the difference of velocity between the buffer memories and the main memory is outstanding as a result of the speeding up of the former and increasing of the capacity of the latter. To cope with this, there has been proposed a method of providing between the buffer memories and the main memory an intermediate buffer memory whose capacity and access time are both intermediate between those of them.

Where a new data block is read out of the main memory for use in a processor, if the intermediate buffer memory has no blank area to store the data block, it is necessary to replace one of data blocks of the intermediate buffer memory with the data block of the main memory.

Heretofore, a method called replacement algorithm has been employed for determining the data block to be removed from the intermediate buffer memory when to store therein a new data block. This is carried out as follows:

(i) The position of the data block to be removed on the intermediate buffer memory is determined according an address pattern.

(ii) The coordination of the positions of data blocks on the intermediate buffer memory and their addresses is prepared in the form of a table and an associative register is used for shortening the time for referring to the table (Set associative system).

(iii) Some data block positions on the intermediate buffer memory are determined according to addresses and one of the data blocks is selected based on a table.

The method (i) has the advantage that hardware used is simple. However, there is a high probability that a data block frequently used by processors is replaced. This increases the number of times of processing for invalidating the data block of the intermediate buffer memory in the case of a write in the main memory. Therefore, this method is inefficient.

The method (ii) is efficient if the coordination table is large, but requires a large amount of hardware. The method (iii) requires less hardware and more efficient, as compared with the method (ii).

At any rate, it is desired to preserve the data blocks of a high frequency of use and to remove the data blocks which will not be used subsequently. But since it is impossible to predict whether or not the data blocks will be used subsequently, the data block to be replaced is determined based on the frequency of its us.

The method that has been used to select the data block replaced with a data block of the main memory most previously is a method of employing a first-in first-out (FIFO) register as the intermediate buffer memory. However, the selected data block may be used currently by a processor in some cases and if a processor requires the data block subsequently, it is necessary to replace it again.

Also, there has been proposed a replacement method employing the LRU (Least Recently Used) algorithm for selecting a least recently used data block as the replacement block. With this method, the data blocks are given priority in the order of reference to prepare a list of the data blocks in terms of the frequency of use. Upon each occurrence of reference, the newly referred data block is placed at the head of the list to shift the previous data blocks to lower priority levels correspondingly. Then, the data block of the lowest priority level is picked up by the algorithm using an LRU array and is replaced with a data block of the main memory. With this method, however, since the priority levels of the data blocks are determined regardless of whether or not they are used currently by the processor, there is no guarantee for reducing the number of times of the buffer invalidation processing (processing of invalidation of a data block in the intermediate buffer memory).

U.S. Pat. No. 3,958,228 is but one patent disclosing an LRU algorithm. Other references disclosing LRU algorithms have been cited during the course of the prosecution of copending U.S. application. Ser. No. 715,862, filed Aug. 19, 1976 and assigned to the same assignee as that of the present application.

SUMMARY OF THE INVENTION

An object of this invention is to provide an intermediate buffer memory data block replacement system for a data processing system which ensures an efficient data block replacement operation.

Another object of this invention is to provide an intermediate buffer memory data block replacement system for a data processing system which eliminates or decreases unnecessary buffer invalidation processing.

Another object of this invention is to provide an intermediate buffer memory data block replacement system for a data processing system which preserves data blocks of a high frequency of use by processors and a data block of no subsequent use is selected as a replacement data block.

Still another object of this invention is to provide an intermediate buffer memory data block replacement system for a data processing system which is adapted to select a replacement data block with a simple circuit construction, employing a conventional circuit as much as possible.

Briefly state, according to this invention, in a data processing system in which a main memory is shared by a plurality of processors, each having a buffer memory of its own, an intermediate buffer memory is provided between the buffer memories of the processors and the main memory, a data block is transferred between the main memory and the buffer memories of the processors through the intermediate buffer memory and copies of data blocks of the intermediate buffer memory are stored in the buffer memories of the processors, when to replace one of the data blocks of the intermediate buffer memory with a data block of the main memory, a data block that the number of its copies stored in the buffer memories of the processors is smaller than the numbers of copies of any other data blocks in the intermediate buffer memory, is selected as the data block to be replaced.

DESCRIPTION OF THE PREFERRED EMBODIMENTS

Figure 1:
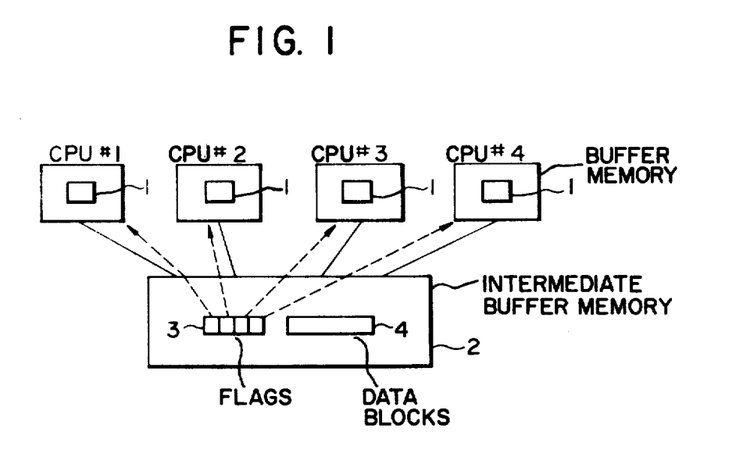
FIG. 1 is a diagram showing connections between an intermediate buffer memory and buffer memories of a plurality of processors in a data processing system.

FIG. 1 shows the connection of an intermediate buffer memory with a plurality of buffer memories in a data processing system.

In FIG. 1, reference numeral 1 indicates buffer memories of central processors (CPU); 2 designates an intermediate buffer memory; 3 identifies flags; and 4 denotes data blocks.

In the intermediate buffer memory 2, there are provided for each data block the flags 3 of the same number as central processors of the data processing system employed, by which it is indicated whether or not a copy of each data block is present in the buffer memory of each central processor. With such an arrangement, when any one of the central processors changes the data block in the intermediate buffer memory 2, a buffer invalid address is sent to the central processor corresponding to that of the flag 3 attached to the data block 4 which is ON, whereby the content of the buffer memory 1 of the corresponding central processor can be rendered to match with the content of the data block 4.

Figure 2:
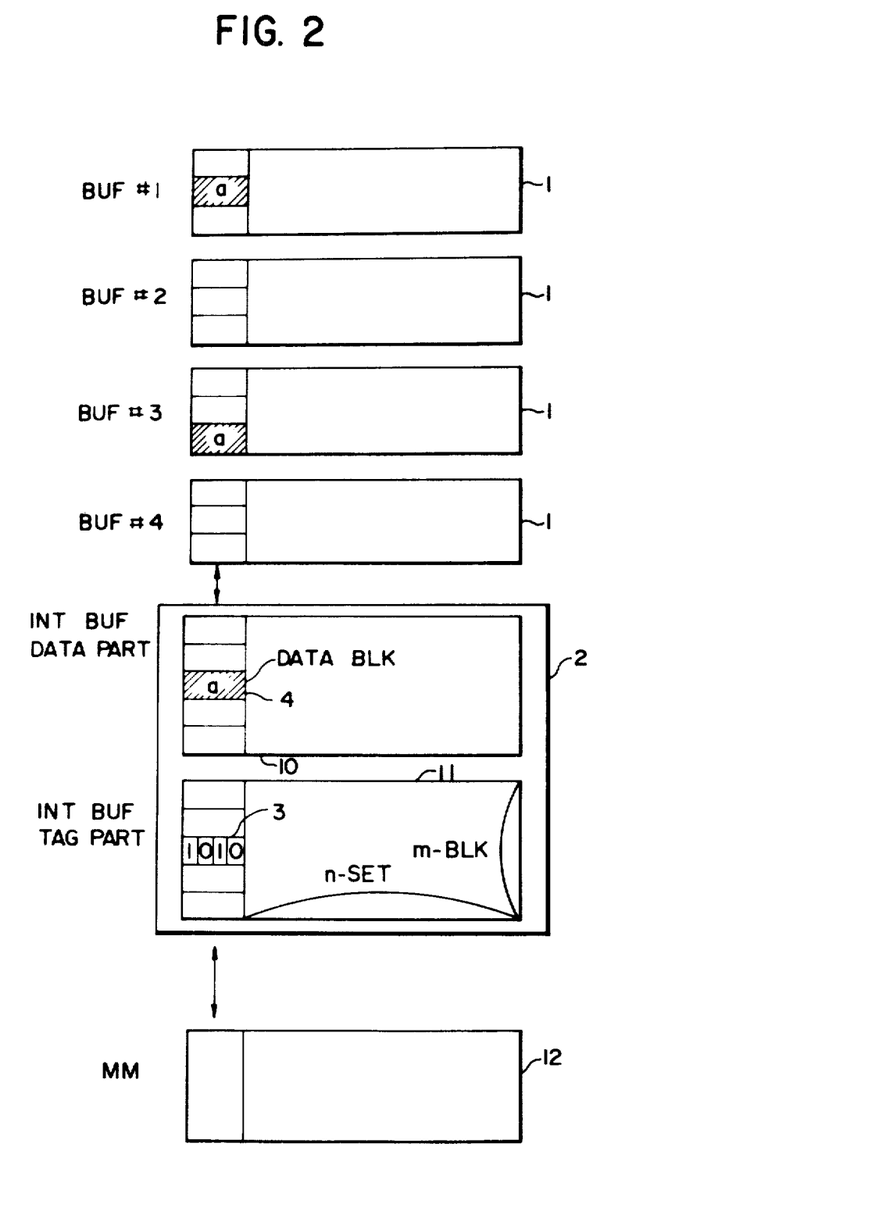
FIG. 2 is a diagram explanatory of replacement of a data block according to the set associative system.

FIG. 2 is an explanatory diagram of a replacement operation in a set associative system.

In FIG. 2, reference numeral 1 indicates buffer memories of central processors; 2 designates an intermediate buffer memory; 3 identifies flags; 4 denotes data blocks; 10 represents an intermediate buffer memory data part; 11 shows an intermediate buffer memory tag part; and 12 refers to a main memory.

Data is transferred between memories in terms of blocks. When a certain central processor requires data, the block containing the required data in the main memory 12 is read out into the intermediate buffer memory 2 and is further transferred to the buffer memory 1 in the central processor.

The intermediate buffer memory 2 is composed of the memory data part 10 and the memory tag part 11. For coordination of the main memory 12 with the intermediate buffer memory 2, the latter is divided into n sets, each composed of plural (m) data blocks. In the memory tag part 11, there are provided for each set the copy flags (block validity indications) 3 of the same number as the data blocks of each set for indicating which block of the set is read in the buffer memory 1. The intermediate buffer memory 2 has further provided therein for each data block an associative register for indicating the address of the data block in the main memory 12 and for the comparison with a reference address, a priority list for registering a new data block in each set to determine which block of the set is to be removed and an LRU replacement array for determining the order of the data blocks in the priority list when they are rearranged, though not shown in FIG. 2.

In the case of the prior art, when a need of block replacement arises in a certain set, a least recently used one of the data blocks in the set is determined by the use of the aforesaid LRU replacement array and is removed the set for replacement with a new data block.

In the present invention, the copy flags 3, which are used in the buffer invalidation processing, are utilized for determining which one of the m data blocks in the set requiring the block replacement is to be replaced. Namely, the data block selected is that in which the number of copy flags 3 in the ON state is smaller than those of any other blocks, and then the LRU algorithm is used as in the prior art.

The replacement operation according to this invention takes place as follows:

(a) Those of the m data blocks in which at least one copy flag is ON are excluded from the LRU algorithm and the remaining data blocks are checked with the LRU replacement array.

(b) Where the data block to be replaced is not determined by the above operation (a), the same operation is achieved except excluding the data blocks in which two or more copy flags are ON.

(c) Where the data block to be replaced is not still determined by the above operation (b), the same operation is repeated again except excluding the data blocks in which three or more copy flags are ON.

In the case of the set associative system, if the number of data blocks for one set in the intermediate buffer memory 2 is sufficiently larger than the number of data blocks for one set in the buffer memory 1 of the central processor, there is always a data block in which the copy flags are all OFF. Accordingly, the data block to be replaced is determined by the operation (a).

Figure 3:
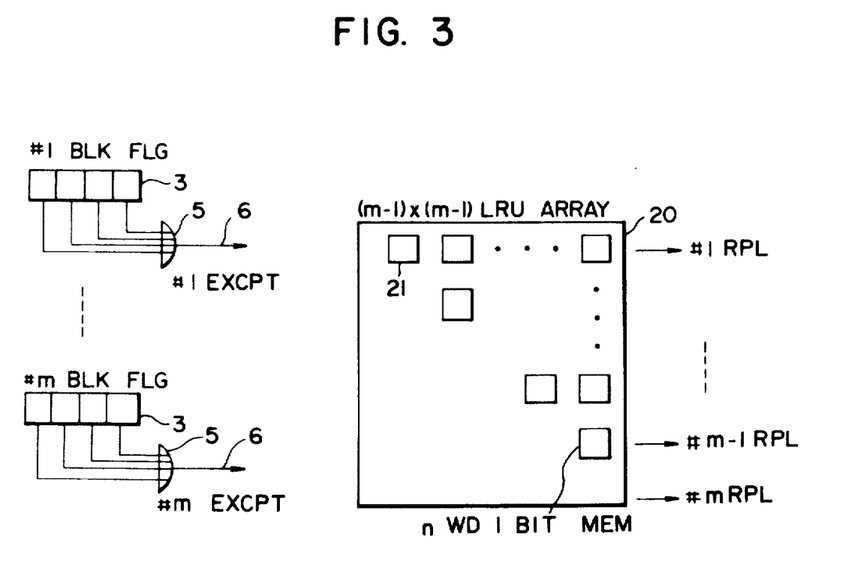
FIG. 3 is a diagram explanatory of the concept of an LRU replacement circuit for excluding a block having a flag weight of 1 or more.

FIG. 3 is a schematic diagram showing the concept of an LRU replacement circuit for excluding the data block whose flag weight is 1 or more.

In FIG. 3, reference numeral 3 indicates flags (FLG); 5 designates OR gates; 6 identifies inhibit signals (#1 to #m EXCEPT); 20 denotes an LRU array (LRU ARRAY); 21 represents n-word 1-bit memory elements (nWD 1BIT MEM). In the operation of determining the data block to be replaced, only the data blocks in which the inhibit signal 6 is OFF are subjected to the LRU algorithm to determine which one of the data blocks #1 to #m is to be used as a replacement block, providing replace signals #1 to #m RPL. After the determination of the replacement block, the array elements of all data blocks are updated. That is, data blocks are newly registered in the respective sets and a new priority list is formed.

Figure 4:
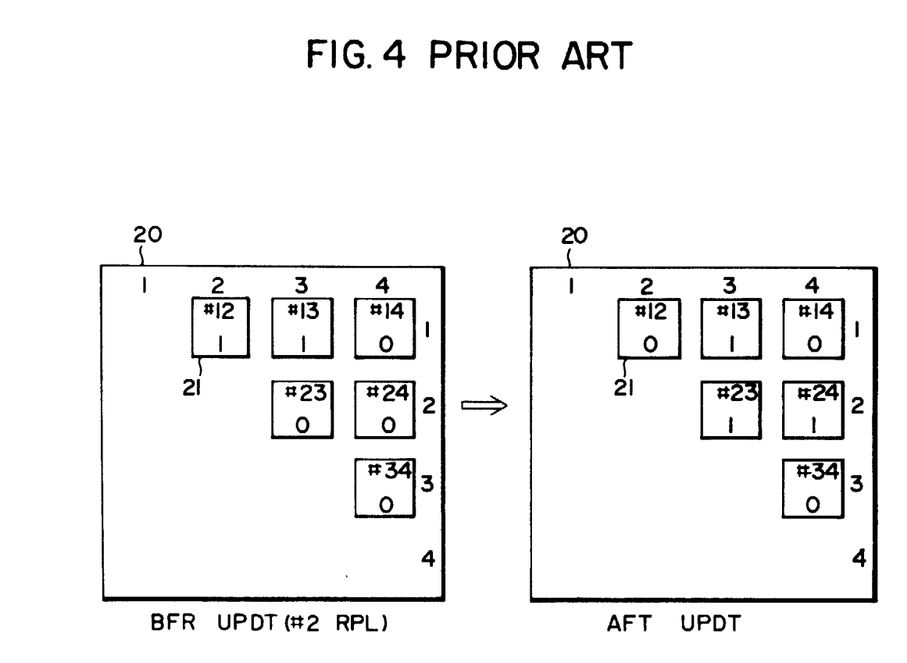
FIG. 4 is an explanatory diagram of a conventional LRU replacement method.

Referring now to FIG. 4, a description will be given of the conventional LRU replacement method employing the LRU array of FIG. 3. FIG. 4 shows the case where four data blocks are provided for each set. The left-hand diagram shows the state before update (BFR UPDT), illustrating the case where the data block #2 is determined to be the replacement block. The right-hand diagram shows the state after update (AFT UPDT). In FIG. 4, #12 to 34 are memory elements. The replacement conditions for the data blocks #1 to #4 are as follows: The condition for replacement of the data block #1 is $\overline{\#12}\cdot\overline{\#13}\cdot\overline{\#14}$. That is, the data block #1 becomes the replacement block when the contents of the memory elements #12, #13 and #14 are all "0." The condition for replacement of the data block #2 is $\#12\cdot\overline{\#13}\cdot\overline{\#14}$. That is, the data block #2 becomes the replacement block when the memory element #12 is "1" and the memory elements #23 and #24 are "0." The condition for replacement of the data block #3 is $\#13\cdot\#23\cdot\overline{\#34}$, and the replacement condition for the data block #4 is $\#14\cdot\#24\cdot\#34$.

In FIG. 4, since the replacement condition for the data block #2 is satisfied, the block #2 is replaced. Before update, #12=1, #23=0 and #24=0 but, after update, since the priority level of the data newly registered as the block #2 is rendered the highest, #12=0, #23=1 and #24=1.

Figure 5:
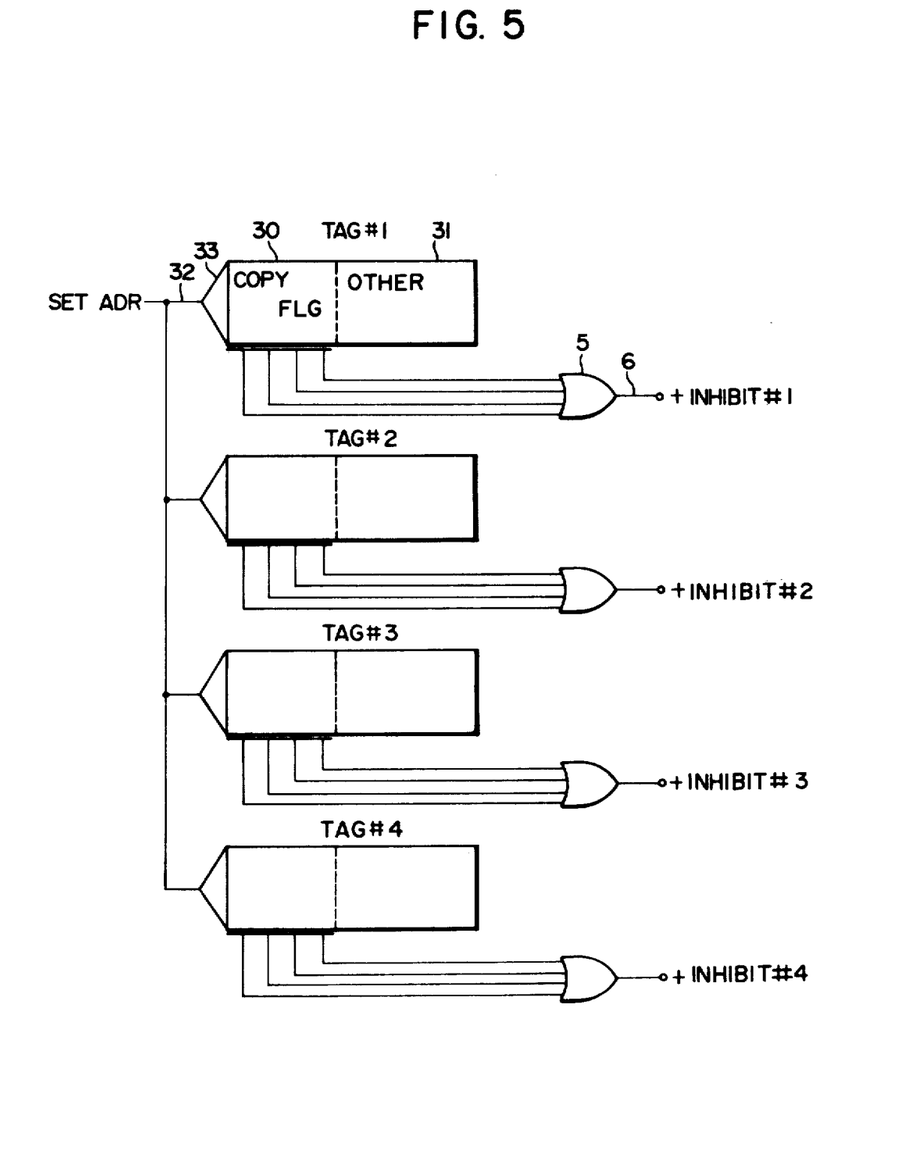
FIG. 5 is a block diagram of a tag part of an intermediate buffer memory, illustrating an embodiment of this invention.
Figure 6:
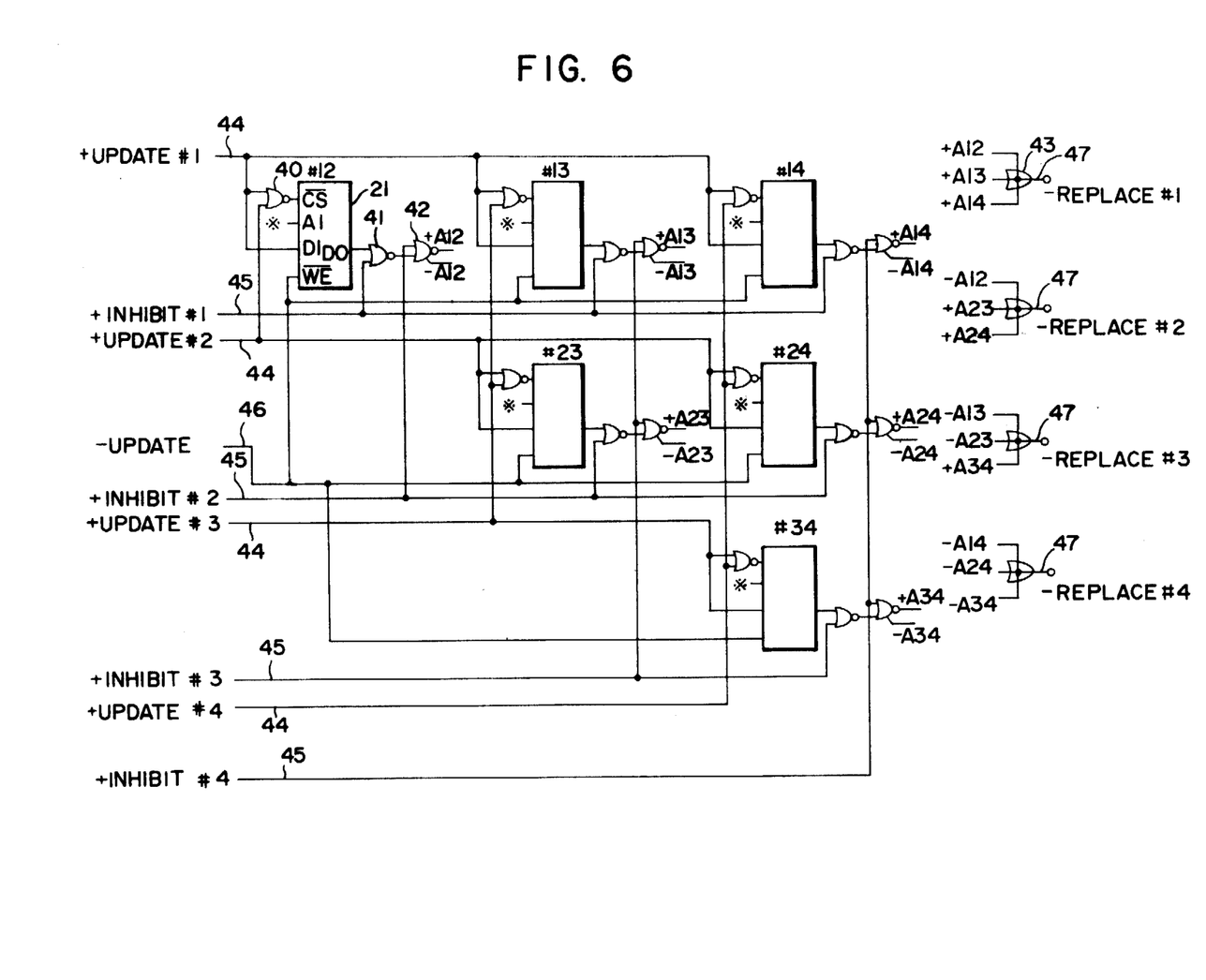
FIG. 6 is a connection diagram of a data block replacement control circuit, showing another embodiment of this invention.

Turning next to FIGS. 5 and 6, an embodiment of this invention will be described in detail. FIG. 5 is a connection diagram of the memory tag part of the intermediate buffer memory and FIG. 6 is a connection diagram of a replacement control circuit, that is an LRU array which receives an inhibit signal from the tag part of FIG. 5 to achieve an LRU operation.

FIGS. 5 and 6 illustrate a replacement circuit for an intermediate buffer memory in which the number of associative levels (the number of blocks in each set of the intermediate buffer memory) is four. Further, FIGS. 5 and 6 shows the replacement algorithm such that those data blocks having even one copy flag in the ON state are excluded from the object of replacement. That is, LRU replacement is executed only with the data blocks in which the copy flags are all OFF.

In FIG. 5, reference numeral 5 indicates OR gates; 6 designates inhibit signals (+INHIBIT #1 to #4); 30 indentifies copy flag areas (COPY FLG); 31 denotes other areas (OTHER) (for example, addresses on the main memory, etc.); 32 represents a set address (SET ADR); and 33 shows address decoders.

When the set address signal 32 is inputted, it is decoded by the decoders 33 and the copy flag areas corresponding to the four data blocks #1 to #4 in the set designated by the set address are read out.

The inhibit signal (+INHIBIT #i (i=1 to 4)) is provided for each flag of each block. The inhibit signal corresponding to the data block stored in the buffer memory of at least one central processor, has a true level "1."

In FIG. 6, reference numeral 21 indicates an n-word 1-bit memory element; 40, 41 and 42 designate NOR gates; 43 identifies an OR gate; 44 denote an individual update signal (+UPDATE #i (i=1 to 4)); 45 represents an inhibit signal (+INHIBIT #i (i=1 to 4)); 46 shows an update signal (−UPDATE); and 47 refers to a replace signal (−REPLACE #i (i=1 to 4)). In the memory element 21, reference character $\overline{CS}$ indicates a chip select signal terminal; AI designates an address signal terminal; DI identifies an input signal terminal; DO denotes an output signal terminal; and $\overline{WE}$ represents a writable signal terminal. In FIG. 6, the marks "+" and "−" prefixed to the signals indicate that the signals become ON ("1") and OFF ("0"), respectively, when they are true.

In the replacement operation, the update signal −UPDATE becomes OFF but the individual update signals +UPDATE #1 to #4 become ON for they make the chip select (CS) inputs "1." As a result of this, LRU information on the data blocks of the set designated by the set address supplied to the set address signal terminal AI of each memory element, is read out therefrom. On the other hand, the inhibit signals +INHIBIT #1 to #4, which are formed based on the contents of the flag areas in FIG. 5, each act on the LRU information read out of the memory element to inhibit the replacement of the data blocks that in which the copy flag of at least one bit is ON. That is, when the inhibit signal +INHIBIT #1 is "1," if at least one of the other signals INHIBIT #2 to #4 is "0," at least one of signals +A12, +A13 and +A14 becomes "1" and the replace signal −REPLACE #1 becomes "1," excluding data block #1 from the object of replacement.

Next, when the inhibit signal +INHIBIT #2 is "1," a signal −A12 becomes "1" and consequently the replacement signal −REPLACE #2 becomes "1," excluding data block #2 from the object of replacement. Similarly, when the inhibit signal +INHIBIT #3 is "1," signals −A13 and −A23 become "1," and when the inhibit signal +INHIBIT #4 is "1," signals −A14, −A24 and −A34 become "1." As a result of this, the replace signals −REPLACE #3 and −REPLACE #4 respectively become "1," excluding data blocks #3 and #4 from the object of replacement, respectively.

In the circuits of FIGS, 5 and 6, the number of data blocks for each set of the intermediate buffer memory is selected to be "4" and the number of central processors is selected to be "4" for facilitating a better understanding of the invention. In practice, however, the number of data blocks for each set of the intermediate buffer memory is usually selected to be sufficiently larger than the sum total of data blocks in respective sets of the buffer memory of each central processor, so that there is no possibility of all the data blocks of the intermediate buffer memory being inhibited from replacement. As a result of such operations as described above, replacement of only one data block in this set is determined and the corresponding replace signal −REPLACE #i becomes true.

Next, for the data block thus replaced, the memory element of the LRU array is updated. That is, the update signal +UPDATE #i corresponding to the replace signal −REPLACE #i which is made true by the replacement operation, also becomes true. Further, the signal +UPDATE becomes ON, by which the writable signal (WE) is made "1" to provide a writable state. Thus, the memory element in the ith row and ith colum is updated in such a manner as to indicate that the data block #i is the most recently used block in the set. The circuit for updating is well-known in the art.

The above embodiment has been described in connection with the case where the number of data blocks for each set of the intermediate buffer memory is larger than the sum total of data blocks in the respective sets of the buffer memory of each central processor. However, there are some occasions when the number of data blocks for each set of the intermediate buffer memory is equal to or smaller than the sum total of data blocks in respective sets of the buffer memory of each central processor. In such an instance, there is the possibility that all of the data blocks of the intermediate buffer memory are read in the buffer memory of the central processor and the data block to be replaced cannot be determined by the operation described above. This can be avoided by selecting the replacement block from such data blocks in which the number of CPU buffer memories having the copies of the blocks is small.

Figure 7:
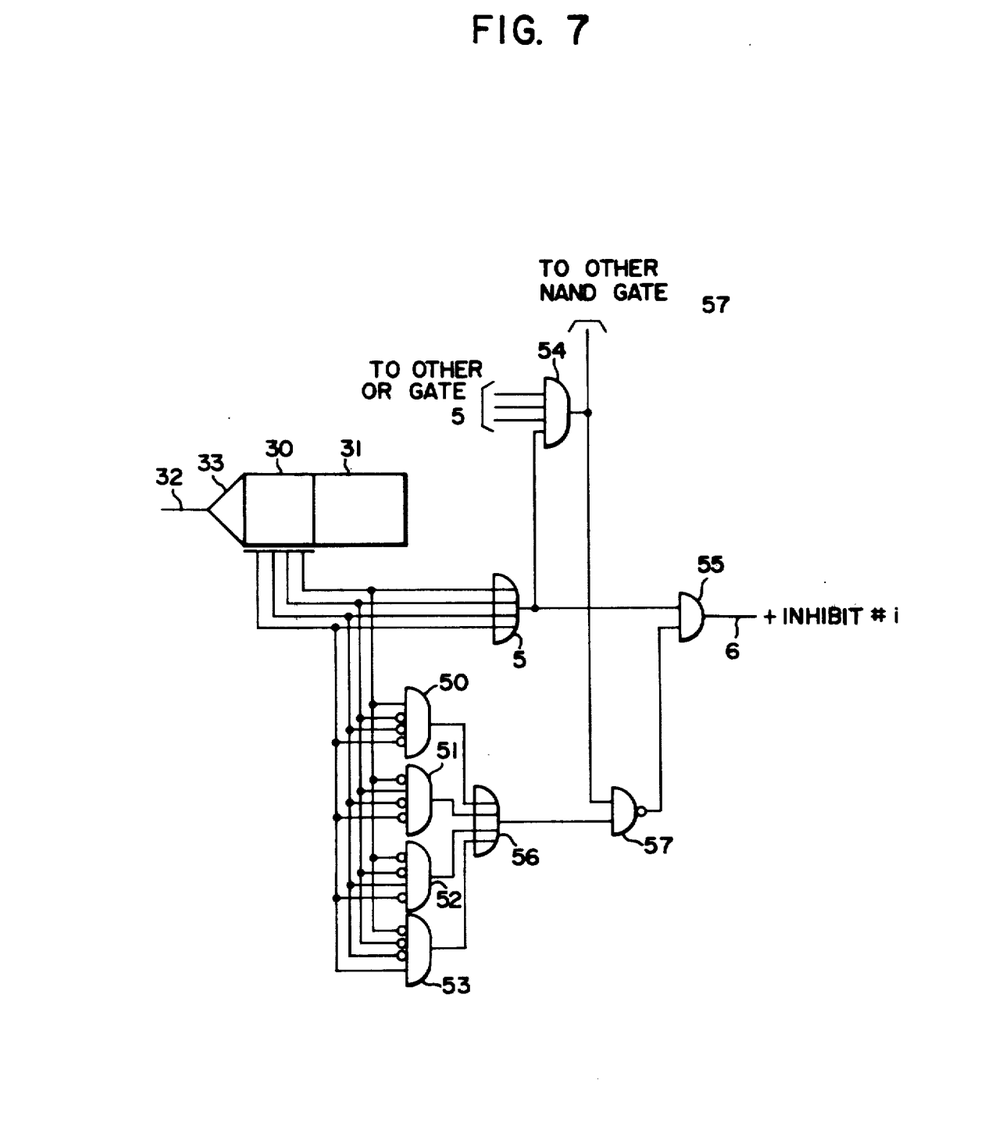
FIG. 7 is a connection diagram of an inhibit signal generator for inhibiting data blocks having a flag weight of 2 or more.

FIG. 7 illustrates an example of an inhibit signal generator in the case where there is the possibility of all data blocks of one set of the intermediate buffer memory being read in the CPU buffer memory but all of the data blocks of the intermediate buffer memory are not read in two or more CPU buffer memories at the same time, that is, two or more flags are not simultaneously turned ON in all of the data blocks.

In FIG. 7, reference numeral 5 indicates an OR gate; 6 designates an inhibit signal +INHIBIT #i; 30 identifies a copy flag area; 31 denote another area; 32 represents a set address; 33 shows an address decoder; 50 to 55 refer to AND gates; 56 indicates an OR gate; and 57 designates a NAND gate.

Where a copy of at least one of the data blocks does not exist in the CPU buffer memory, any one of the outputs from the OR gate 5 becomes "0" to make the output from the AND gate 54 "0" and the output from the NAND gate 57 "1." As a result of this, the inhibit signal +INHIBIT for the data block to be excluded from the replacement operation is outputted via the OR gate 5 and the AND gate 55.

Next, in the case where all the data blocks are read in the CPU buffer memory but at least one of the data blocks is read in only one central processor, the output from the AND gate 54 becomes "1" and the output from the OR gate 56 corresponding to the data block read in only one central processor also becomes "1." Accordingly, the output from the NAND gate 57 becomes "0" to inhibit the AND gate 55, providing no inhibit signal corresponding to the abovesaid data block.

In this manner, the replacement block can be selected from the data blocks in which that the number of CPU buffer memories having a copy of the data block is small.

In this case, it is sufficient only to modify the inhibit signal generator of FIG. 5 and the replacement control circuit of FIG. 6 need not be modified.

Also, in the case where the data blocks of one set of the intermediate buffer memory are all read in two or more CPU buffer memories at the same time, an inhibit signal can be obtained by the same method as described above.

Where the circuits of FIGS. 5 and 7 are connected in parallel with each other, even if the inhibit signal for excluding the data block in which two or more flags are ON cannot be obtained with the circuit of FIG. 5, the inhibit signal cannot be provided by switching to the circuit of FIG. 7.

In the case of a multi-CPU system, buffer invalidation processing attendant with a store instruction is a severe burden on the buffer memory. Generally, store occurs once for about six instructions and the frequency of occurrence of the buffer invalidation processing is $1/6E \times 3(CPU)$.

In the system having an intermediate buffer memory, there is provided in its memory tag part a flag indicating whether or not a copy of a buffer is in each block, by which unnecessary buffer invalidation is eliminated in a buffer coordination control.

In this instance, if the data block in which many flags are ON is replaced from the intermediate buffer memory, the effect of removing the unnecessary buffer invalidation is impaired. The data block having many flags in the ON state has a high probability of receiving the store instruction from many central processing units. In other words, the presence of a copy of the block in the buffer memory indicates that the data block is frequently used by the central processor. Especially in the multi-CPU system, the data block having a large weight of the abovesaid flag is considered to be a data block which is used most frequently in the system.

With the intermediate buffer memory replacement system of this invention, in the block replacement between a main memory and an intermediate buffer memory, the data block replaced in the intermediate buffer memory most previously is not merely removed but instead the data block to be replaced is selected from the data blocks whose copies are not stored in the CPU buffer memories or the data blocks that the number of CPU buffer memories having stored therein the copies of the blocks is small. This provides the advantage of facilitating an efficient replacement opration of the intermediate buffer memory.

It will be apparent that may modifications and variations may be effected without departing from the scope of novel concepts of this invention.

What is claimed is:

1. An intermediate buffer memory data block replacement system for a data processing system in which a main memory is shared by a plurality of processors, each having a buffer memory of its own, and having an intermediate buffer memory provided between the buffer memories of the processors and the main memory, and comprising a first means, operatively connected to said main memory and said plurality of processors, for enabling a data block transfer between the main memory and the buffer memories of the processors through the intermediate buffer memory and for storing copies of data blocks of the intermediate buffer memory in the buffer memories of the processors, said first means comprising replacing means for replacing one of the data blocks of the intermediate buffer memory with a data block of the main memory, said replacing means selecting as the data block to be replaced that data block having a smaller number of its copies stored in the buffer memories of the processors than that of any other data block in the intermediate buffer memory.

2. An intermediate buffer memory data block replacement system for a data processing system in which a main memory is shared by a plurality of processors, each having a buffer memory of its own, and having an intermediate buffer memory provided between the buffer memories of the processors and the main memory, and comprising a first means, operatively connected to said main memory and said plurality of processors, for enabling a data block transfer between the main memory and the buffer memories of the processors through the intermediate buffer memory and for storing copies of data blocks of the intermediate buffer memory in the buffer memories of the processors said first means comprising replacing means for replacing one of the data blocks of the intermediate buffer memory with a data block of the main memory, said replacing means selecting as the data block to be replaced that data block having a smaller number of its copies stored in the buffer memories of the processors than that of any other data block in the intermediate buffer memory, wherein the intermediate buffer memory has copy flags for indicating the data blocks copied in the buffer memories of the processors and means for sensing said copy flags, whereby the data block selected as the data block to be replaced is that data block having a smaller number of sensed copy flags than that of any other data block in the intermediate buffer memory.

3. An intermediate buffer memory data block replacement system according to claim 2, wherein the data block to be placed is selected by means of an LRU logic circuit from the group comprising all the data blocks of the intermediate buffer memory except for those data blocks having at least one of their corresponding copy flags ON.

4. An intermediate buffer memory data block replacement system according to claim 3, wherein when the data blocks having at least one of their corresponding copy flags ON are excluded from the selection of the replacement data block, if the data block to be replaced cannot be selected by the LRU logic circuit, then the data block to be replaced is selected by the LRU logic circuit from the group comprising all the data blocks of the intermediate buffer memory except for those data blocks having at least two of their corresponding copy flags ON.

5. An intermediate buffer memory data block replacement system as in claim 2, wherein the data block to be replaced is selected by means of an LRU logic circuit and wherein when the data blocks having at least one of their corresponding copy flags ON are excluded from the selection of the replacement data block, if the data block to be replaced cannot be selected by the LRU logic circuit, then the data block to be replaced is selected by the LRU logic circuit from the group comprising all of the data blocks of the intermediate buffer memory except for those data blocks having at least two of their corresponding copy flags ON.

* * * * *

UNITED STATES PATENT AND TRADEMARK OFFICE
CERTIFICATE OF CORRECTION

PATENT NO. : 4,181,937

DATED : January 1, 1980

INVENTOR(S) : Akira Hattori et al

It is certified that error appears in the above-identified patent and that said Letters Patent are hereby corrected as shown below:

insert in heading--[30] Foreign Application Priority Data
November 10, 1976[JP] Japan........51-135053 --.

Abstract, line 6, "(least" should be --(Least--

Col. 1, line 64, after "according" insert --to--

Col. 2, line 16, after "and" insert --is--

Col. 2, line 23, "us" should be --use--

Col. 3, line 11, "state" should be --stated--

Col. 4, line 40, "is removed" should be --the data block is removed from--

Col. 6, line 54, "FIGS," should be --FIGS.--

Col. 8, line 47, "may" should be --many--.

Signed and Sealed this

Twenty-seventh Day of May 1980

[SEAL]

Attest:

SIDNEY A. DIAMOND

Attesting Officer  Commissioner of Patents and Trademarks